US008983439B1

(12) United States Patent  (10) Patent No.: US 8,983,439 B1
Martin et al.  (45) Date of Patent: Mar. 17, 2015

(54) METHOD AND SYSTEM FOR OFFERING A MEDIA CONTENT ITEM

(75) Inventors: Geoff S. Martin, Overland Park, KS (US); Jay S. Harmon, Overland Park, KS (US); Baoquan Zhang, Overland Park, KS (US); Jonathan Kindred, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 884 days.

(21) Appl. No.: 12/560,121

(22) Filed: Sep. 15, 2009

Related U.S. Application Data

(63) Continuation of application No. 11/508,506, filed on Aug. 22, 2006, now abandoned.

(51) Int. Cl.
H04L 29/06 (2006.01)

(52) U.S. Cl.
USPC .......................... 455/414.3; 455/433; 455/415

(58) Field of Classification Search
USPC ................. 455/433, 186.2, 412.1–413, 415, 455/418–420, 550.1, 556.1, 556.2, 566, 455/567, 461, 424, 403, 401, 428, 466, 455/432.3; 705/14.64, 26; 709/706, 207, 709/219
See application file for complete search history.

(56) References Cited

U.S. PATENT DOCUMENTS

| | | |
|---|---|---|
| 5,423,058 A | 6/1995 | Cudak et al. |
| 5,845,213 A * | 12/1998 | Sumner et al. ................ 455/458 |
| 6,731,738 B1 | 5/2004 | Qiu et al. |
| 6,889,044 B1 | 5/2005 | Cook |
| 7,035,675 B2 | 4/2006 | Yamada |
| 2004/0019634 A1 * | 1/2004 | Van Geldern et al. ........ 709/203 |
| 2004/0114732 A1 | 6/2004 | Choe et al. |
| 2004/0131081 A1 * | 7/2004 | Bhatia et al. .................. 370/466 |
| 2004/0174983 A1 | 9/2004 | Olschwang et al. |
| 2004/0253993 A1 | 12/2004 | Nakamura |
| 2005/0094796 A1 | 5/2005 | Beauford |
| 2005/0105706 A1 | 5/2005 | Kokkinen |
| 2005/0107128 A1 | 5/2005 | Deeds |
| 2005/0175161 A1 | 8/2005 | Reynolds et al. |
| 2005/0176425 A1 * | 8/2005 | Kawakami et al. ........ 455/432.3 |
| 2005/0207555 A1 | 9/2005 | Lee et al. |
| 2006/0029202 A1 | 2/2006 | Koskela |
| 2006/0126815 A1 | 6/2006 | Hahm et al. |
| 2006/0147017 A1 | 7/2006 | Moody et al. |
| 2006/0160579 A1 | 7/2006 | Ure |
| 2006/0165059 A1 | 7/2006 | Batni et al. |

(Continued)

OTHER PUBLICATIONS

U.S. Appl. No. 11/090,346, filed Mar. 24, 2005, Lundy et al., "Method and System for Management of Call Tones."

*Primary Examiner* — Chuong A Ngo

(57) ABSTRACT

A media system includes a content platform that provides an interface for browsing and/or purchase of ringback media content by a user of a communications device. The system includes a profiles database containing profile information for a multitude of users of communications devices. The media system further includes a memory storing instructions for execution by the platform which causes it to 1) obtain information from the device including assignment of ringback media content to contacts in an address book maintained on the device; and 2) update the profiles database in accordance with the information obtained from the device. The information obtained in 1) may be obtained automatically, each time the user accesses the content platform. The system may further include an analyzer module which is used to generate targeted promotional messages based on the contents of the profile database.

12 Claims, 3 Drawing Sheets

(56) References Cited

U.S. PATENT DOCUMENTS

| | | | |
|---|---|---|---|
| 2006/0173974 A1* | 8/2006 | Tang | 709/217 |
| 2006/0177044 A1* | 8/2006 | O'Neil et al. | 379/373.02 |
| 2007/0061197 A1* | 3/2007 | Ramer et al. | 705/14 |
| 2007/0061198 A1* | 3/2007 | Ramer et al. | 705/14 |
| 2007/0264978 A1* | 11/2007 | Stoops | 455/414.1 |
| 2008/0040758 A1* | 2/2008 | Beetcher et al. | 725/81 |

* cited by examiner

, 
METHOD AND SYSTEM FOR OFFERING A MEDIA CONTENT ITEM

REFERENCE TO RELATED APPLICATIONS

This is a continuation of U.S. patent application Ser. No. 11/508,506, filed Aug. 22, 2006, the entirety of which is hereby incorporated by reference.

BACKGROUND

A. Field

The invention relates to methods and systems for providing "ringback" media, e.g., tones, music, speech or other media, to a caller's phone. Ringback is the ringing or other sound that a caller hears while waiting for the called party to answer the phone. The invention also relates to systems and methods for uploading information from the device to a platform providing ringback media, and uses of such information, e.g., for statistical analysis and generation of targeted promotional messages.

B. Related Art

In traditional phone systems, a switch in telephone network plays a ringback tone in the form of call tones to the calling party. The switch may be at caller's end of the call or at the called party's end of the call. The provision of call tones to a calling party is sometimes referred to in the art as "call tones service."

In this respect, call tones service is different from some other services, such as customized ringers, screensavers, games and applications etc. In these other types of services, the end device (typically a mobile device which includes telephone functionality) downloads a specific type of media/information, and then runs it from the end device. For example, for ringers, the mobile device downloads the particular ringer media from a network-based server, and then the user can use the ringer by assigning it to callers or call types.

Call tones service, as noted above, is usually network-based. That is, call tones media is played from a network device (typically, a call tones server) not the end device. The call tones are packetized from a call tones server and transmitted over a communications network to the end device calling party. (Call tones are packetized if Voice over Internet Protocol (VoIP) technology is involved. Currently most call tones systems are TDM-based. In a non-VoIP scenario, the call tones would be transmitted the same way as traditional TDM voice signals). In some instances, the call tones server is operated by the third party provider of the call tones content. Regardless of whether the call tones server is operated by a wireless service provider or a third party content provider, downloading of call tones to the end device is unnecessary.

In a current method of operation, the call tones systems usually have a content management interface from where call tones contents are either manually or automatically provisioned. The call tones are supplied by a particular content provider that has contracted with the call tones service provider. Alternatively, the call tones service provider may choose to perform the content management function itself. Under this method, the call tones users usually access a call tones catalog and make purchases of call tones content via interactive interfaces provided by the call tones system. Such interface may take the form of a web interface, interactive voice response unit (IVR), or via short message service (SMS) or wireless application protocol (WAP) messaging.

SUMMARY

In a first aspect, a media system is disclosed which includes a content platform providing an interface for browsing and/or purchase of ringback media content by a user of a communications device. The content platform may take the form of a processing unit functioning as a call tones server and associated software instructions providing a interface for browsing or purchasing content.

The media system further includes a profiles database containing profile information for a multitude of users of communications devices. Such profiles database may include information such as the make, model, geographical location, age group, and assignment of call tones to particular numbers, for each subscriber.

The media system further includes a memory storing instructions for execution by the processing unit, the instructions causing the processing unit to: 1) obtain information from the device including assignment of ringback media content to contacts in an address book maintained on the device; and 2) update the profiles database in accordance with the information obtained from the device. The information obtained in 1) may be obtained automatically, each time the user accesses the content platform.

In one embodiment, the media system further includes an analysis module accessing information from the profiles database and conducting an analysis of the information. For example, the analysis module may be a statistical analysis module which is executed in the platform processor per se, or it could reside on a separate processing unit. The analysis may be used for various purposes, including for identifying promotional opportunities, e.g., alert the user that some new content is available or that they may not be aware of the most popular content in their age group or region. The media system thus may further include a means for generating a promotional message for the device based on the analysis conducted by the analysis module. Such promotional message may be generated and transmitted in a variety of formats, including SMS, instant message, email, voice mail, or other. Such promotional message may be generated or sent while the user is browsing/purchasing, or may be transmitted later on.

In another respect, a method is disclosed for providing ringback media content to a communications device, comprising the steps of: establishing a connection between the device and a content server platform; automatically retrieving information from the device including assignment of ringback media content to contacts in an address book; updating a profiles database with information automatically obtained from the device; analyzing the profiles database and responsively determining a promotional message for the device regarding purchase of additional ringback media content; and transmitting the promotional message to the device.

In still another aspect, an improvement to a call tones platform is disclosed. The call tones platform includes a processing unit and a profiles database. The improvement comprises providing in the call tones platform a memory storing software instructions for execution by a processing unit in the call tones platform. The instructions cause the platform to generate a message to a communications device which causes data indicative of the assignment of call tones to telephone numbers to be transmitted from the communications device to the call tones platform. The improvement further includes instructions for responsively updating the profiles database with the data.

These and still other aspects of the invention will be more fully explained in the following detailed description and with reference to the drawings.

DETAILED DESCRIPTION OF PREFERRED EMBODIMENT

Figure 1:
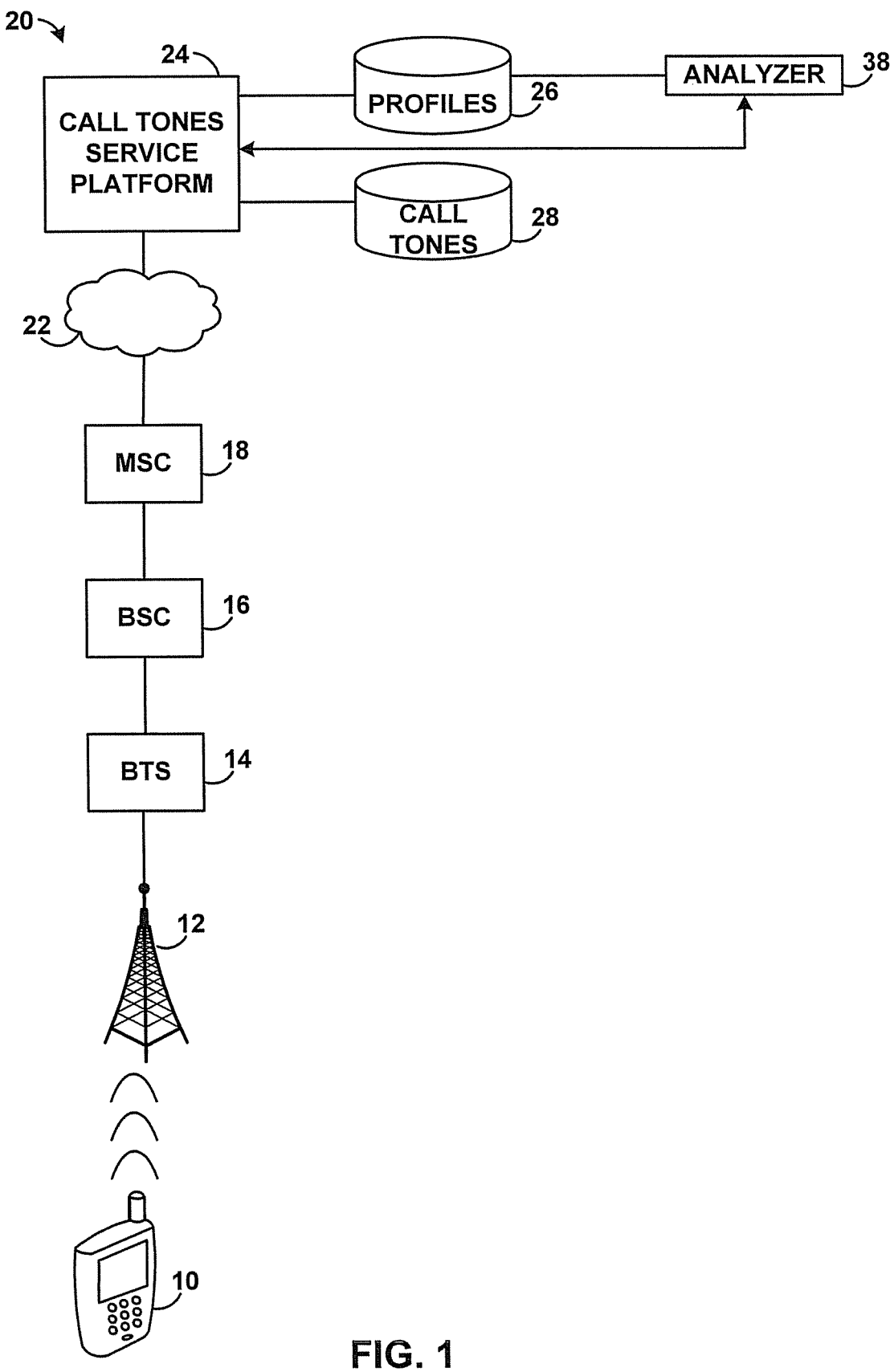
FIG. 1 is a block diagram of a system providing call tones service for a wireless communications device.

FIG. 1 is a block diagram of a system in which a user of a telephone 10 may connect to a call tones system 20. The basic idea of FIG. 1 is to provide a mechanism for a user of a telephone 10 to connect to a call tones system, automatically upload a phone directory including call tones assignments from the telephone 10 to the call tones system, and update the profile database 26 for the user. By updating the network side of the call tones system in this fashion, several advantages can be obtained. One primary advantage is that statistical analysis of the profile database can be performed. Such statistical analysis can be used to determine promotional messages that are targeted to the user of the telephone, as described later in this document.

The telephone 10 is depicted as a wireless phone which communicates over an air interface with a wireless communications infrastructure, which may take the form of a GSM or CDMA cellular telephone network, the details of which are known in the art. The telephone 10 may take the form of a cellular telephone, personal digital assistant, palm computer, or other equivalent device with phone functionality. The phone could also be a land-line phone. The present discussion will refer to the phone 10 as one which is used by a subscriber of wireless telephone services, such services provided by a wireless service provider which manages the call tones system 20. In one embodiment, the phone 10 is based on a uiOne operating system, details of which are http://brew.qualcomm.com/brew/en/about/uione.html. The illustrated phone 10 includes an antenna and processing circuitry for engaging in RF communications with a wireless network infrastructure having an antenna 12, base transceiver station 14, base station controller 16 and a mobile switching center 18. These details are conventional and known in the art, e.g., in IS-41 wireless networks. The MSC 18 is connected to a wireless service provider network 22, which may take the form of a wide area packet-switched network. The wireless infrastructure may also incorporate Ev-DO (Evolution data only) technology.

The call tones system 20 includes a call tones service platform 24, a profiles database 26 and a call tones database 28, and an analyzer 38. The call tones service platform 24 may take the form of a general purpose computing platform which is connected to the network 22. The platform 24 is programmed with instructions for communicating with the device 10, obtaining phone book and other information from the device, transmitting promotional messages to the telephone 10, and updating a call tones profile for the user in the profiles database 26, as described herein. The profiles database 26 is a database which stores profile information for a multitude of subscribers, such as for example the phone book or contacts lists for each subscriber, and for each one an association of a particular call tone with particular callers.

The call tones database 28 is a database containing call tones media files. In an alternative configuration, the database 28 stores information identifying particular call tones (such as ID numbers or names for them), but does not store the actual media files.

The analyzer 38 is a module which conducts statistical analysis of the profiles database 26 as described herein. The analyzer 38 could be integrated with the platform 24 or be implemented in a different computing platform.

Figure 2:
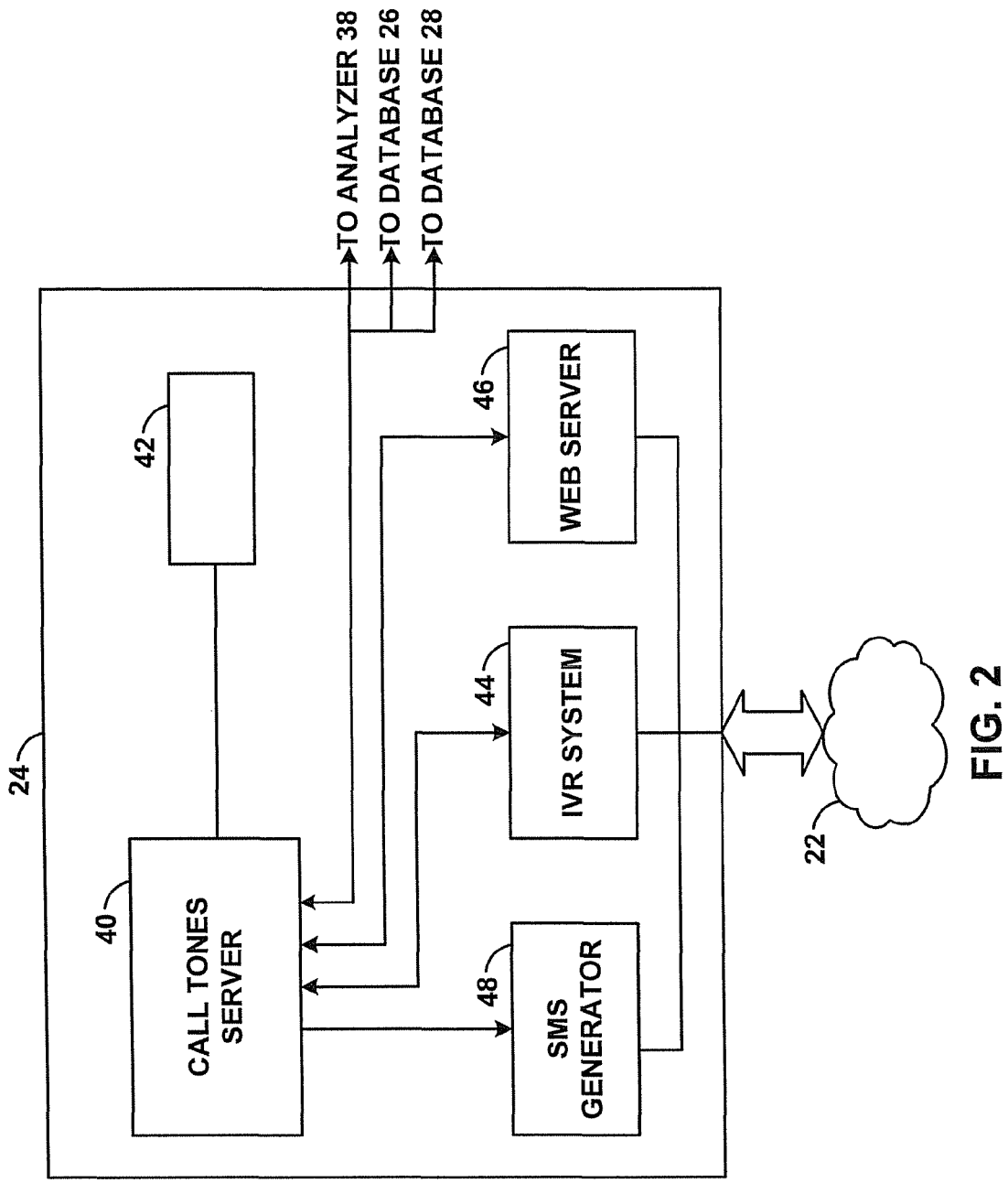
FIG. 2 is a more detailed illustration of the call tones service platform of FIG. 1.

FIG. 2 is a more detailed view of one possible configuration of the platform 24. The platform 24 includes a call tones server 40 and a memory 42 storing program instructions. The call tones server 40 may further implement third party software features for accessing the call tones stored in the database 26 or the profiles database 28. The call tones services platform 24 provides a facility whereby the phone 10 may browse for or purchase media content such as ringback tones. Such facility may take the form of an interactive voice response system 44, a web server 46 serving web pages and media files in response to requests from client devices, or other type of facility. The particular construction of the platform 24 is not particularly important. The SMS generator 48 of FIG. 2 is a module which generates and transmits promotional messages in SMS message format to the phone 10 based on analysis conducted by the analyzer 38 of FIG. 1.

Figure 3:
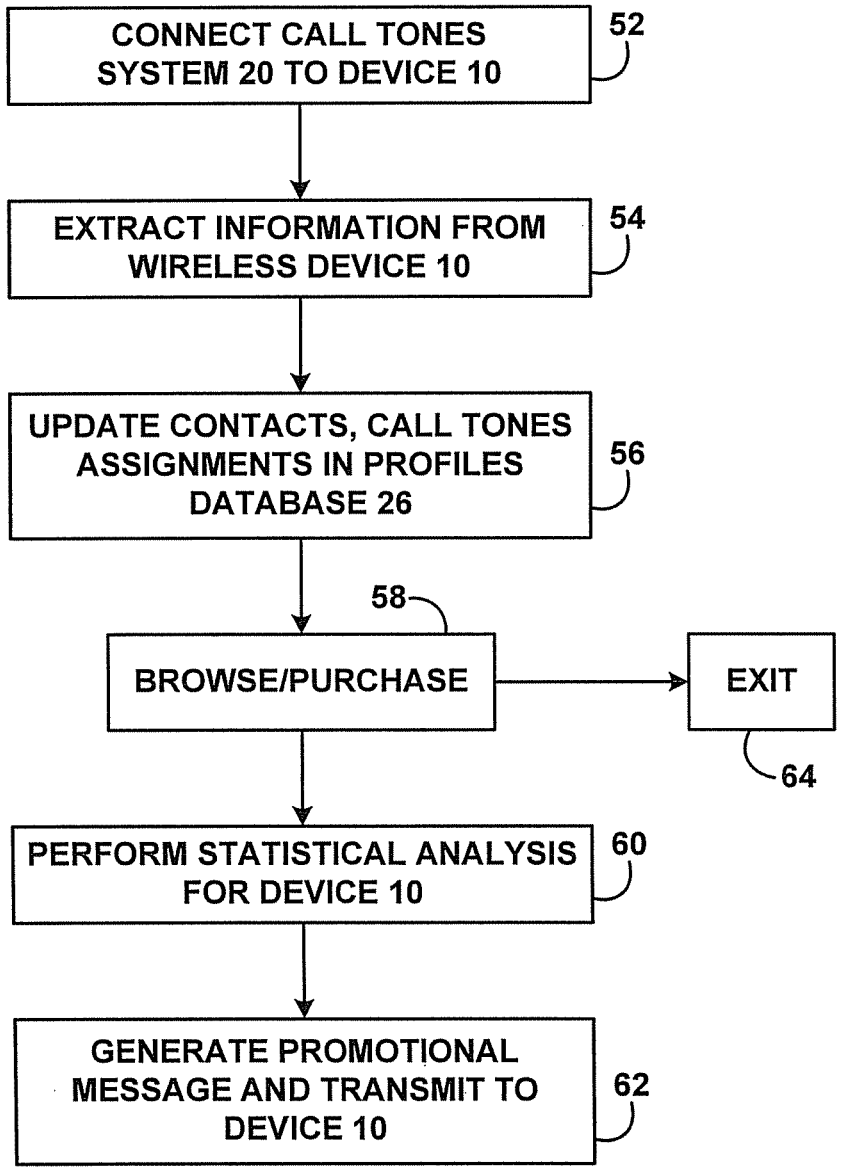
FIG. 3 is a flow chart showing a messaging flow by which a personal phonebook and other information is uploaded from a wireless device when it contacts the call tones platform of FIG. 1, and showing steps of statistical analysis and generation of promotional messages.

The operation of the system of FIG. 1 will now be described with reference to the flow chart 50 of FIG. 3. At step 52, the telephone 10 connects to the call tones platform 24 in the call tones system 20 by accessing the wireless network infrastructure (e.g., by turning the phone on), launching a browser on the phone, and accessing the call tones service platform 24 by clicking on an appropriate icon on the user interface, entering the URL of the platform, or other manner, the details of which are not important. The purpose of establishing the connection between the phone 10 and the platform 30 may be for example that the user of the phone 10 wishes to browse or purchase additional content, e.g., call tones.

At step 54, the call tones system platform 54 executes software instructions stored in the memory 42 which cause the platform 24 to obtain information from the phone 10, including among other things the assignment of ringback media content to contacts in an address book stored on the phone. Basically, when the phone 10 connects to the platform 24, the instructions cause an exchange of messages between the phone and platform such that the platform 24 pulls off the phone automatically the address book from the phone (which includes the current assignment of call tones to particular phone numbers), as well as other information such as the year, make and model of phone, the location or region of where the phone is registered (e.g., by area code assigned to the phone number), and possibly an inventory of the type of data which is on the phone. The software extracting this information is invoked each time a caller accesses the call tones system 20. The details of such software may vary depending on the operating system and software versions resident on the device, but persons skilled in the art should be able to develop such software from the teachings of the present disclosure.

At step 56, a synchronization process occurs, in which the profiles database 26 is updated in accordance with the information obtained from the device 10. In particular, the profile of the user of the phone 10 is accessed and the information in the profiles database is updated, e.g., new assignments of ring tones, based on the information obtained at step 54.

At step 58, the user of the phone 10 browses at the call tones system, using the features of the interactive voice response system or web server aspects of the system, depending on how the user is connected to the system 20. The user may make a purchase of a new call tone. If that occurs, the user profile in the database 26 is updated. The user assigns the new call tone to one or more phone numbers, using the user interface features of the IVR system or web page features of the web server.

While the browsing/listening/purchasing activity is occurring at step 58, in one embodiment the analyzer 38 of FIG. 1 accesses the user profiles database and conducts a statistical analysis of the user's profile, as indicated at step 60. Such analysis can be for various purposes, one of which is to determine particular targeted promotional messages to send to the device 10. For example, the analyzer module 38 may determine that the user is from a particular region (determined by the area code assigned to the phone 10), and that the user of the phone falls in a particular age group, say under 18. The analyzer then queries the database 26 to see which are the most popular ring tones for phones in that region. If the profile for the phone 10 indicates that that ring tone is not currently in the profile, one possible promotional message to send to the phone 10 is one telling the user of the phone that call tone X is the most popular one in their age group, and that they might want to order it. The content of the promotional message may be determined by the analyzer module, by a processor in the call tones platform 24 which communicates with the analyizer, or other. As indicated at step 62, the content of the messages is sent to an SMS generator 48 (FIG. 2), which generates the SMS message containing the promotional message and transmits it to the phone 10. The promotional message may use other transmission format, such as instant messaging, voice prompt, email, voice mail, or other. Accordingly, while the SMS generator is one possible means for generating the promotional message, other means may also be used such as computer system generating instant messages, an interactive voice response system generating a voice prompt message, an email server, etc.

The steps 60 and 62 may occur while the browsing and purchasing activity is ongoing, or may occur later after the user of the phone 10 terminates its connection from the call tones platform. Such termination is indicated at 64 in FIG. 3. The exit may occur for example when they complete a purchase transaction, or when they navigate to another site using the browser on the phone 10.

The description will be further illustrated by the following example.

A user of a wireless telephone 10 connects to the call tones service platform 24 by turning on their phone and selecting an icon for the call tones platform on the device browser. The phone automatically connects to the wireless network and the platform 24 delivers a web page welcoming the user to the call tones platform 24. At the same time, the platform exchanges messages which extracts the user's current address book, including assignment of call tones to particular numbers. Additionally, the year, make and model of the phone is extracted. This exchange of messages may be done "behind the scenes." Alternatively, the user could be presented with a dialog box such as "uploading address book".

When the platform retrieves the address book, the platform 24 updates the profiles database for the user to reflect the current assignment of call tones to particular numbers. The user commences browsing the call tones site for interesting call tones. Meanwhile, the analysis module conducts an analysis of the profiles database to identify possible call tones of interest to the user, based on demographical, region, or other information in the database and the contents of the address book. The call tones platform generates the content of a promotional message based on the results of the statistical analysis. While the user is browsing, the platform generates a promotional message and sends it to the phone 10 while the user is browsing. The user is presented with an opportunity to listen to the call tone(s) identified in the promotional message and purchase the call tones.

While presently preferred and alternative embodiments have been described, variation from the illustrated embodiments is possible without departure from the scope of the invention. The scope is to be determined by reference to the appended claims.

We claim:

1. A method comprising:
   a call tones system maintaining in a profiles database a profile of a wireless device, wherein the profile comprises information obtained from the device, wherein the information comprises at least one association between media content and contacts in an address book maintained on the device;
   the call tones system obtaining updated information from the device, wherein the updated information comprises at least one updated association between media content and contacts in an address book maintained on the device;
   the call tones system updating the profile of the device in accordance with the updated information obtained from the device;
   the call tones system making a determination that a given media content item is not currently in the updated profile;
   responsive at least to the determination that the given media content item is not currently in the updated profile, the call tones system transmitting via a network to the device an offer for the given media content item.

2. The method of claim 1, wherein the offer is a promotional message.

3. The method of claim 1, wherein transmitting via the network to the device the offer comprises transmitting at least one of an SMS message, an instant message, a voice prompt, and a voice mail.

4. The method of claim 1, wherein obtaining updated information from the device comprises obtaining updated information from the device when a user of the device accesses a media system to shop for media content items.

5. The method of claim 4, wherein transmitting via the network to the device the offer comprises transmitting the offer while the user is shopping for the media content items.

6. The method of claim 1, wherein the given media content item is a ringback tone.

7. The method of claim 1, further comprising selecting the given media content item based on a popularity level.

8. A server facilitating media content selection, comprising:
   a database maintaining a profile of a wireless device, wherein the profile comprises information obtained from the device, wherein the information comprises at least one association between media content and contacts in an address book maintained on the device; and
   a processor and machine instructions executable by the processor to (i) obtain updated information from the device, wherein the updated information comprises at least one updated association between media content and contacts in an address book maintained on the device; (ii) update the profile of the device in accordance with the updated information obtained from the device; (iii) make a determination that a given media content item is not currently in the updated profile; and (iv) responsive at least to the determination that the given media content item is not currently in the updated profile, transmit via a network to the device an offer for the given media content item.

9. The server of claim 8, wherein the machine instructions are executable by the processor to obtain the updated information from the device when a user of the device accesses a media system to shop for at least one media content item.

10. The server of claim 8, wherein the offer is a promotional message.

11. The server of claim 8, wherein the given media content item is a ringback tone.

12. The server of claim 8, wherein the machine instructions are further executable by the processor to select the given media content item based on a popularity level.

* * * * *